United States Patent [19]

Howell et al.

[11] Patent Number: 4,497,782

[45] Date of Patent: Feb. 5, 1985

[54] METHOD FOR DESTROYING TOXIC ORGANIC CHEMICAL PRODUCTS

[75] Inventors: Samuel G. Howell, 4666 Aston Dr., Cincinnati, Ohio 45244; William R. Birchall, 55596 Country Club Rd., South Bend, Ind. 46619

[73] Assignees: S. Garry Howell; Lloyd Watson, both of Cincinnati, Ohio; William R. Birchall, South Bend, Ind.; Larry Allen, Ft. Mitchell, Ky.

[21] Appl. No.: 570,853

[22] Filed: Jan. 16, 1984

Related U.S. Application Data

[63] Continuation-in-part of Ser. No. 437,434, Oct. 28, 1982.

[51] Int. Cl.[3] .......... C01D 3/00

[52] U.S. Cl. .......... 423/184; 423/659; 423/DIG. 12; 55/228

[58] Field of Search .......... 423/DIG. 12, 184, 659; 55/228

[56] References Cited

U.S. PATENT DOCUMENTS

| | | | |
|---|---|---|---|
| 3,505,018 | 4/1970 | Bawa et al. | 423/653 |
| 3,642,583 | 2/1972 | Greenberg et al. | 203/11 |
| 3,647,358 | 3/1972 | Greenberg | 55/228 |
| 3,647,583 | 3/1972 | DeRouw et al. | 428/209 |
| 3,845,190 | 5/1973 | Yosim et al. | 423/184 |
| 4,145,396 | 3/1979 | Grantham | 423/22 |

OTHER PUBLICATIONS

A.P.C. Application of Beck, Walter et al, Ser. No. 393,258, published Jul. 13, 1943.

Fukada, Shuzo et al, "Cracking Aromatic Chlorinated Hydrocarbons", Appl. 737196, Jan. 1973, abstracted in Chem. Abs. vol. 82, 1975, #142517r.

*Primary Examiner*—John Doll
*Assistant Examiner*—Robert L. Stoll
*Attorney, Agent, or Firm*—Wood, Herron & Evans

[57] ABSTRACT

A method for destroying toxic organic chemical products. The method is particularly adapted for the destruction of polyhalogenated polyphenyls, especially polychlorinated biphenyls (PCBs). The toxic organic chemical product is intimately contacted and reacted with a molten mixture of an alkali metal hydroxide and an alkali metal nitrate, so that it is converted to harmless products which, in the case of PCBs, include a halide salt, at least one carbon oxide, and water. By incorporating a substantial excess of nitrate in the mixture most of the salt is caused to precipitate and to settle out to the bottom for easy removal.

15 Claims, 2 Drawing Figures

METHOD FOR DESTROYING TOXIC ORGANIC CHEMICAL PRODUCTS

RELATED APPLICATION

This application is a continuation-in-part of our copending U.S. patent application Ser. No. 437,434, filed Oct. 28, 1982.

FIELD OF THE INVENTION

The present invention relates to a method for destroying environment-contaminating toxic organic chemical products, including polychlorinated biphenyls.

DESCRIPTION OF THE PRIOR ART

The problem of environmental contamination caused by toxic materials and the related health risks to all forms of life has become of major concern as industrial societies seem to create ever increasing numbers of toxic chemical products, particularly organic products. Environmental contamination may occur by reason of the toxicity of such a product, per se, or by reason of the toxicity of by-products formed during the use of such a product, or by reason of the toxicity of by-products formed during the manufacture of such a product. The problem of environmental contamination has become of such magnitude, in fact, that the federal government and many state governments have established independent agencies charged with the responsibility of controlling, or at least minimizing, all forms of environmental contamination.

Environmental contamination occurs in a number of ways. It may, for instance, occur when toxic products resulting from the combustion of petroleum, coal and other carbonaceous energy sources are released directly into the atmosphere, as during the operation of vehicular engines. Such contamination also occurs at industrial installations that rely on carbonaceous fuels as energy sources. At least in the United States, vehicular gasoline engine emissions are now required by law to be catalytically oxidized to less obnoxious by-products prior to being discharged to the atmosphere. Emissions from coal and other carbonaceous fuel-burning industrial installations are similarly treated, or are burned at very high temperatures in afterburners. Various other means and methods have been proposed to treat environment contaminating emissions of this type. One such proposal is discussed in Greenberg U.S. Pat. No. 3,647,358 and involves subjecting industrially generated carbon and hydrocarbon waste products to the catalytic action of a molten salt bath at temperatures below the normal combustion temperatures of such waste products, without chemical reaction occurring between the waste products and any of the components of the salt bath.

Environmental contamination also occurs when toxic organic chemical products that are not the products of combustion of carbonaceous fuels, enter the environment. Such toxic organic chemical products may be primary products, i.e., those manufactured for a specific use such as, for example, a herbicide, pesticide, insecticide, or the like. They may be secondary products, i.e., by-products resulting from the manufacture of primary products. Toxic organic chemical products may enter the environment in various ways, for example, by release to the atmosphere during their manufacture, or by release into water supplies by leaching from agricultural lands to which they have been applied or from landfills into which they have been deposited without detoxification, or by release from other products in which they have been used as components.

The toxic organic chemical products above referred to often take the form of polynuclear aromatic organic compounds which are substituted on the nucleus by halogen, sulfur, or phosphorous atoms. Representative of this type of toxic organic chemical products and those to which the method of this invention is particularly directed, are polyhalogenated polyphenyl compounds and, more particularly, polychlorinated biphenyls, often referred to simply as PCBs. PCBs, and polyhalogenated polyphenyls in general, are prepared by the direct chlorination of the selected polyphenyl compound which results in a mixture of isomers the bulk of which, in the case of PCBs, are reported to be the trichloro- and tetrachloroisomers, with the balance being the other isomers. The polychlorinated polyphenyls, including the PCBs, are considered to have excellent properties of inertness, fire resistance and thermal stability, all of which has rendered them highly suited for use in a variety of areas including varnishes and paints, copy paper, plasticizers, printing inks, lubricants, and particularly in electrical transformers and capacitors.

Although PCBs have been known chemically for many years and have been manufactured and used commercially for quite some time in the several areas noted above, the significance of their toxicity has only been recognized more recently. Because of this lack of knowledge concerning their toxicity, these products were permitted to enter the environment through uncontrolled burning and direct disposal into public sewage systems and landfills without regard to the possible consequences of these acts. The seriousness of this earlier uncontrolled disposal of PCBs, and related toxic products, is now recognized in the light of more recent knowledge that these products are very resistant to biodegradation and will, accordingly, persist in the environment for long periods of time.

The conventional way to destroy toxic organic chemical compounds has been to subject them to burning at very high temperatures, as above described with respect to the products of combustion of carbonaceous fuels. PCBs, however, are known to be quite resistant to oxidation, so that when these, and related products, are subjected to burning in conventional industrial furnaces, it often is impossible to maintain the high destructive temperatures for the required residency time necessary to convert them to carbon dioxide, water and hydrogen halide. In order to attain these high destructive temperatures, i.e., greater than 1100° C., and to maintain them for a residence time sufficient to totally destroy the PCBs, therefore, requires specialized furnace equipment which can be costly to fabricate. Moreover, since aromatic halogen derivatives such as PCBs have notoriously low fuel values, destruction of such products by burning necessarily requires an external heat source in order to reach and maintain the conversion temperatures. Finally, destruction of PCBs and related halogenated products produces highly corrosive hydrogen halide acids which should be neutralized before discharge, preferably at a point in the procedure designed to minimize their corrosive effect on the furnace and allied equipment.

Reference was earlier made herein to Greenberg U.S. Pat. No. 3,647,358 which suggest the use of a molten salt bath as a catalytic oxidizing medium for the destruction of various industrially generated carbon and hydrocarbon waste products. The use of a molten salt bath has also been proposed in U.S. Pat. No. 4,145,396 by treating waste materials containing a radioactive element. The use of a melt of a hydroxide by itself to decompose PCBs is taught in Japanese patent application Ser. No. 7196/73, filed Jan. 16, 1973. The use of a molten solvent has also been proposed in U.S. Pat. No. 3,845,190 for the disposal of certain types of organic pesticidal compounds. None of these, however, is concerned with the destruction reaction here involved, and none enables the solid reaction product to be so easily removed, which is an important advantage for continuous operation.

SUMMARY OF THE INVENTION

Notwithstanding the fact that PCBs are no longer commercially manufactured in the United States and are totally banned in some areas of the world, the environmental hazards of these products continue to exist simply because there are other areas of the world where PCBs continue to be manufactured and used, albeit under varying degrees of governmental control in most instances. Moreover, the most widely applied area of use for PCBs in the United States has been in electrical transformers and capacitors which have useful lives of many years, but which, on eventual replacement, must have their PCB content totally destroyed. Currently, the only procedures which have been accepted by the U.S. Environmental Protection Agency for destroying PCBs and related toxic halogenated products are destruction by burning, a procedure that has the several disadvantages noted above, and by treatment with sodium metal, an expensive treatment which is limited to dilute, nonaqueous solution of PCBs. Accordingly, there has remained a serious need for an improved method for destroying PCBs and related halogenated products.

It is a principal object of this invention to provide such a method. It is a further object of this invention to provide a method of destroying PCBs and other toxic organic chemical products that is total in its effect and in compliance with the standards established by the U.S. Environmental Protection Agency. A still further object of this invention is to provide a method for destroying PCBs and other toxic products that does not require the excessively high temperatures demanded by burning. It is also an object of this invention to provide a method of destroying PCBs and related halogenated products that does not result in highly corrosive, or otherwise objectionable, emissions. Another objective of this invention is to provide a method of destroying PCBs and related halogenated products that can also be used effectively to destroy other types of toxic organic chemical products such as, for instance, organic aromatic compounds substituted by sulfur and/or phosphorus atoms.

These various objects are met in accordance with this invention by providing a method of destruction that comprises reacting the toxic organic product with a molten mixture of an alkali metal hydroxide and an alkali metal nitrate to form an alkali metal salt, under conditions such that the salt is precipitated from the molten mixture and settles out. More particularly, in a specific embodiment the method of this invention comprises intimately mixing PCBs, or related halogenated products, with a molten alkali metal hydroxide-alkali metal nitrate mixture, under such conditions of temperature, time, and melt composition as will cause the total destruction of the PCBs by converting the halogen content to an alkali metal halide salt which is precipitated, and by converting the carbon and hydrogen content to carbon dioxide and water, which are released in vapor form.

While it is not the intention to restrict this invention by any particular theory of operation, it would appear that the method involves the reaction of the PCBs by the alkali metal hydroxide to form the corresponding alkali metal halide, one or more carbon oxides, and water. Notwithstanding the property of unusual inertness that PCBs are known to possess, it has, nevertheless, been reported in the literature that under very extreme conditions PCBs will react with sodium hydroxide to form a dehalogenated biphenyl as an organic secondary reaction product ("Chlorinated Biphenyls and Related Compounds" by R. E. Hatton, *Encyclopedia of Chemical Technology,* Kirk-Othmer, Wiley Interscience Publications, Wiley & Sons, lst Ed., Vol. 5, pp. 844–848). The dehalogenated biphenyl resulting from the alkali metal hydroxide reduction is then apparently oxidized by the alkali metal nitrate, principally to water and carbon dioxide, the alkali metal nitrate being reduced in the latter reaction to the alkali metal nitrite. In further consideration of the theory of operation, practice of the method of the invention appears to have shown some apparent evidence of a synergistic effect of the two component molten bath, since a melt of either component alone fails to produce the same degree of destruction. In any event, whatever the theory, destruction of PCBs and related halogenated products by the method of this invention is complete in an environmental sense so as to comply with the standards established by the United States Environmental Production Agency for these products.

The proportion of nitrate and hydroxide should be sufficient to stoichiometrically react with the toxic feed. Beyond that, however, it has surprisingly been found desirable to maintain a substantial excess of nitrate over the stoichiometric proportion actually needed to oxidize the organic secondary reaction product, e.g., the dehalogenated biphenyls. It has been determined that use of a substantially higher proportion of nitrate than required for reaction reduces the solubility of the reaction product salt in the melt, and thereby facilitates precipitation of salt from the liquid phase. Moreover, it has further been found that increasing the proportion of nitrate reduces the viscosity of the mixture, thereby enabling the precipitated salt particles to settle out from the melt and to collect at the bottom. This greatly facilitates removal of salt from the reaction site, and is especially useful in a continuous or semi-continuous process.

The mol amount of nitrate to be used should be at least twice that of the hydroxide present. In respect to the salt, the amount of nitrate should be such as to cause the salt to exceed its solubility limit and so to precipitate. The optimum proportions depend on melt temperature, the nature and concentration of the salt, and other factors. For a given set of circumstances the optimum proportion can be determined by a series of comparative tests, in which the amounts of hydroxide and salt are held constant and the proportion of nitrate is gradually increased. An $NO_3$/OH mol ratio of about 3:1 is preferred where the nitrate is regenerated and reused, and where the OH/PCB ratio is near unity. At very high ratios of nitrate to hydroxide it appears that salt solubility begins to increase, so that above that level salt is not so readily precipitated from the melt. At present, it appears that $NaNO_3$/NaOH/PCB ratios of at least 2:1:1 will usually accomplish salt precipitation, and substantially higher ratios are preferred.

DETAILED DESCRIPTION

Figure 1:
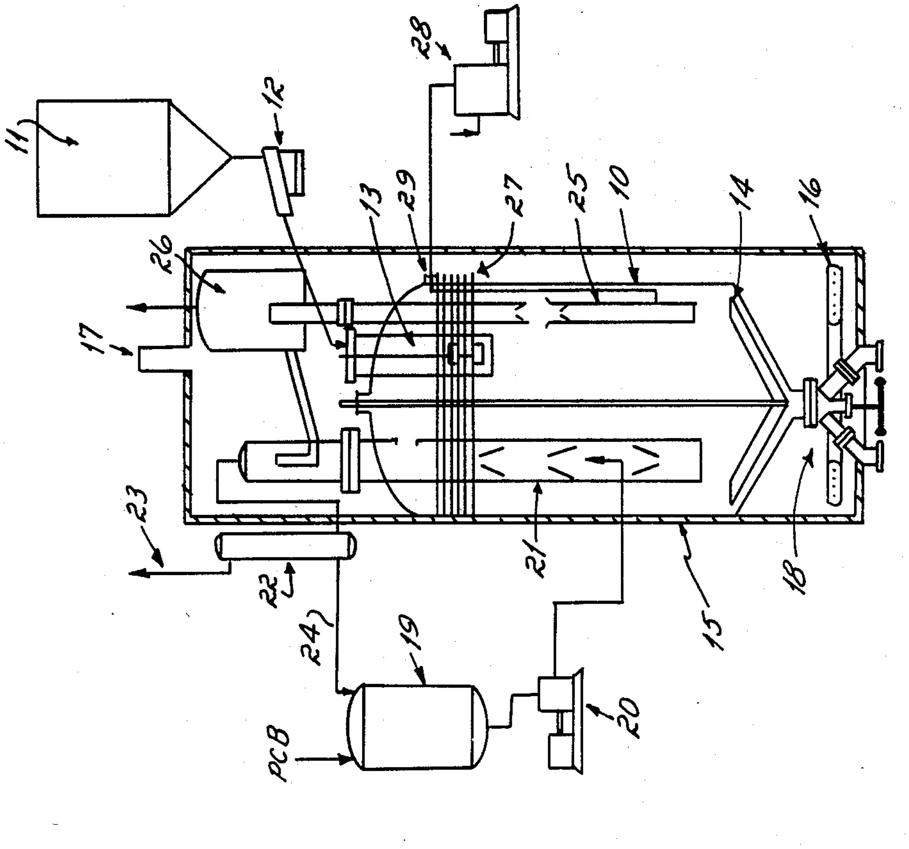
FIG. 1 is a schematic view illustrating a system for carrying out the method of this invention, wherein the toxic product is in liquid form.

Referring now to FIG. 1, there is schematically represented an enclosed chemical reaction vessel 10 adapted to hold the hydroxide-nitrate molten bath in which the destruction of a toxic organic chemical product, such as PCBs, is to be carried out. Reference numeral 11 indicates a hydroxide-nitrate mix storage hopper from which the mix is fed by mix feeder 12 through mix feed column 13 into reaction vessel 10, wherein it is kept in an agitated condition by agitator blade 14. Surrounding reaction vessel 10 is a heating enclosure 15 provided with a heating element 16 by means of which the hydroxide-nitrate mix is maintained in a molten state. Provided at the top of heating enclosure 5 is an exhaust vent 17 for discharge of the heating element products of combustion, while at the bottom of heating enclosure 15 and associated with reaction vessel 10 is a salt discharge valve 18 through which alkali metal halide can be withdrawn. Reference numeral 19 indicates a toxic product storage tank from which the product intended for destruction is fed by means of pump 20 into reactor 10 through toxic product feed column 21, the lower end of which extends beneath the surface of the hydroxide-nitrate molten bath. The upper end of toxic product feed column 21 extends through the enclosed top of reaction vessel 10 into the upper section of heating enclosure 15 from which it communicates with reflux condenser 22 on the exterior of heating enclosure 15. Reflux condenser 22 is provided with exhaust means 23 for venting uncondensed reaction vapors from reaction vessel 10 to the atmosphere, and a condensate line 24 for refluxing condensed reaction vapors from reaction vessel 10 back to toxic product feed column 21. The upper end of a nitrite oxidizing column 25 extends through the enclosed top of reaction vessel 10 and communicates with a demister 26 in the upper section of heating enclosure 15, from which it communicates directly with reaction vessel 10 through toxic feed column 21 and indirectly therewith through reflux condenser 22. Surrounding reaction vessel 10 is a heat exchanger 27 for preheating air passing from air compressor 28 into nitrite oxidizing column 25 through air valve 29.

In carrying out the method of this invention using the apparatus of FIG. 1, the hydroxide-nitrate mix selected to constitute the melt is conveyed from hydroxide-nitrate storage tank 11 into reaction vessel 10 via feeder 12 and mixer 13. The metal-based components of the mix may be any member selected from the class of alkali metals but, for purposes of the method of this invention, the hydroxides and nitrates of sodium and potassium are preferred as a practical matter because of their common industrial availability. Whether or not the metal-based components of the hydroxide and nitrate are the same as or different than one another appears to be immaterial from the standpoint of the efficacy of the method but, as a practical matter, they will usually be the same.

In the case of PCBs, with respect to which further description will be directed, the amount of metal hydroxide present in the mix must be sufficient to essentially completely convert the chlorine content of the PCBs to the metal chloride salt, while the alkali metal nitrate must be present in sufficient amount to essentially completely oxidize the carbon and hydrocarbon content of the PCBs to a carbon oxide and water, and to cause salt precipitation and settling. Since the isomer mix can vary from situation to situation in the chlorination of biphenyl, it is desirable to analyze the PCBs so that appropriate hydroxide-nitrate quantities and mol ratios can be provided to effect the intended destruction and precipitation. The mol amount of nitrate should be substantially higher than that of the hydroxide to cause the salt to be readily precipitated and to settle out.

Reaction vessel 10 is heated by means of heating element 16 so as to convert the hydroxidenitrate mix to a molten bath which serves as the medium in which the destruction of the PCBs will take place. The temperature of the molten bath can range from a minimum of about 250° C. to as high as 800° C., or even higher. The exact temperature in any particular situation will be determined by the heat required to maintain the hydroxide-nitrate mix in a molten state without decomposition of either component, and by the heat required to carry out the destructive reactions of the PCBs. For most purposes, it has been found that a melt temperature of about 275° C. to 450° C. maintained in the reaction zone will be effective in attaining the desired destruction, when the PCBs are in the liquid phase in the melt.

Once the molten alkali metal hydroxide-alkali metal nitrate bath has been formed and the intended reaction temperature established, a stream of PCBs to be destroyed is introduced into reaction vessel 10 from storage tank 19. The normal physical form of PCBs may vary from liquids to solids of varying crystallinity depending upon the isomer mix. Any of these may be treated by the method of this invention in their normal physical form. For ease of injection into the molten bath the PCBs should be in a liquid form. Introduction of the PCBs into reaction vessel 10 is made preferably beneath the surface of the molten hydroxide-nitrate bath by injecting the liquid PCBs slowly into a flowing stream of air or oxygen.

As the PCBs are slowly added to the hydroxidenitrate melt, the destructive reactions commence. Alkali metal chloride is formed which is only partially soluble in the melt and which, if the nitrate concentration is high enough, precipitates toward the bottom of reaction vessel 10 from which it can eventually be withdrawn through salt discharge valve 18. Gaseous reaction products formed by the nitrate oxidation of the dechlorinated biphenyl residue accumulate in reaction vessel 10 and are passed through reflux condenser 22. Any condensate drawn off from reflux condenser 22 is returned as a reflux in toxic product feed column 21. Uncondensed vapors in reflux condenser 22, comprising principally carbon dioxide and water, are discharged to the atmosphere. The reaction time required to attain complete destruction of the PCBs, or other product, as the case may be, will vary from situation to situation depending upon the composition of the toxic product and the quantity of toxic product to be destroyed. The needed reaction time in each situation can best be established by simple tests.

During the destructive reactions of the PCBs, a stream of the molten bath, now containing alkali metal nitrite as a product of the nitrate reduction, may be withdrawn from the body of the bath and passed through nitrite oxidizing column 25. Alkali metal nitrate can be regenerated by contacting the stream of nitritebearing melt in nitrite oxidizing column 25 with preheated air introduced through air valve 29. The oxidized stream of melt now bearing at least some regenerated alkali metal nitrate is passed through demister 26 for removal of droplets, and is returned to reaction vessel 10 through toxic product feed column 21. Hydroxide is consumed by reaction with the toxic product, and should be replaced as needed. Although the nitrate can be regenerated in the bath, some is carried out as salt is removed. Replacement nitrate should therefore be added to maintain the desired proportions.

In order to provide better contacting, columns 13, 21 and 25 are desirably provided with baffle plates or agitating means as shown in the drawing. Use of motor driven agitating means (such as shown in column 13) is preferred.

Although not essential to the efficacy of the method of this invention, an oxidation catalyst such as ammonium molybdate can be incorporated in the hydroxidenitrate melt. Similarly, injection of air into the reacting hydroxide-nitrate melt can be continued after addition of the PCBs is completed for all or a part of the reaction period, to oxidize the nitrate that are formed.

Figure 2:
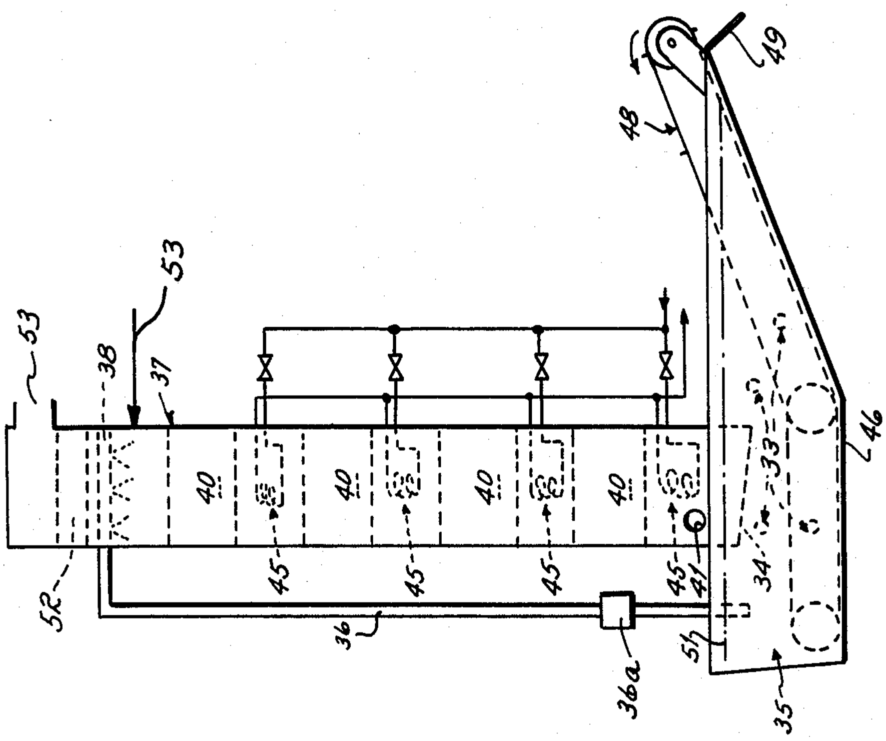
FIG. 2 is a schematic view illustrating the presently preferred continuous method for the practice of the invention, wherein the toxic product is vaporized.

FIG. 2 shows a presently preferred method for carrying out the method of the invention on a continuous or semi-continuous basis, with the toxic product in a gaseous phase. In this apparatus, which is not claimed herein and which is to be the subject of a separate patent application, the nitrate-hydroxide liquid mixture is contacted with PCB vapor in countercurrent flow relation. The nitrate and hydroxide are charged to a tank or reservoir 35 wherein they are initially melted by an external heat source means, i.e., a gas flame or heater tubes 33, to produce a liquid melt. The melt is then delivered from the reservoir 35 by a pump 36*a*, through a line 36, to the top of a reaction column 37. The lower end 34 of column 37 extends below the liquid level 51. The molten hydroxide-nitrate mixture is distributed over the internal cross-sectional area at the top of the column, as by a spray head 38, and makeup reagents are added through line 53 and trickles downwardly over a series of packing sections 40 in the column. These plates may comprise corrugated steel sheets. Desirably four vertically spaced packing sections 40 are provided. The toxic product is carried by an air stream in a line 41, and is supplied into column 37 near the lower end thereof, above the melt surface 51. The feed may comprise liquid droplets. This feed falls onto the melt, the temperature of which is above the boiling point of the material to be destroyed, so as to vaporize it. (The boiling points of PCBs are in the range of about 275°–500° C., depending on the particular compound.) The toxic product is vaporized, and it and the vapor of its decomposition products rise upwardly in column 37, in countercurrent flow to the falling streams of hydroxide-nitrate mixture. The composition of the reacting mass varies greatly along the column; the toxic product reacts near the bottom to form secondary organic products which then react in the higher packing sections. The nitrate and hydroxide concentration is high at the top of the column but becomes progressively lower toward the bottom. Once initiated, the destruction process is highly exothermic and large quantities of heat must be removed in order to maintain a steady temperature. Desirably this is carried out, as shown in the drawing, by cooling coils 45 between the respective packing sections 40. A coolant is passed through the coils 45 to maintain the reaction mass at the desired temperature level. If necessary, pump upflow line 36 can also be cooled.

The toxic product vapor reacts with the molten mixture in the packing section and produces salt which is carried downwardly in the column by the melt streams. Provided the proportion of nitrate in the tank is sufficiently high, the salt is precipitated and the particles settle out in the melt pool in the tank 35, to the bottom 46. The tank is provided with drag bar conveyor 48 which scrapes the salt particles from the bottom of the tank and sweeps them over an apron 49 for easy removal. The gaseous reaction products, i.e., carbon dioxide and water vapor, pass through a mist eliminator 52 and a vent 53 at the top of the column.

It is a highly desirable feature of the invention that the salt is segregated in the bath at the bottom and can be easily removed in crystal form. This avoids the accumulation of dissolved or suspended salt in the melt, and greatly facilitates continuous operation. It also insures that the concentration of reactants remains high, to drive the reaction toward completion.

By way of demonstrating the effect of a high proportion of nitrate in causing the reaction product salt to precipitate, the following series of comparative tests was run.

A. Salt was gradually added to a clear melt of $NaNO_3$ at a temperature of 400° C. When the salt content of the mixture reached approximately 6% (% by weight of the total) grains of salt were visible, indicating that the solubility limit of the salt was reached. The salt did not dissolve but remained as undissolved salt grains.

B. NaOH was added to the 6% NaCl melt of A, above, to provide a 3:1 mol ratio of $NaNO_3$ to NaOH. The viscosity of the melt did not change greatly, but the salt grains dissolved. This shows that salt is more soluble in a $NaNO_3$/NaOH melt than in $NaNO_3$ alone.

C. Salt was gradually added to the $NaNO_3$/NaOH/NaCl mixture of B. At about 14% NaCl, by weight of the total mixture, the solubility limit of the salt was again reached and the salt grains remained undissolved in the melt.

D. Salt was added to a 400° C. melt of $NaNO_3$ and NaOH in 5:1 mol ratio. The solubility limit of the salt was reached at only about 8%. This shows that the higher proportion of nitrate facilitates precipitation of a larger proportion of salt from the melt.

E. When the melt of D is cooled from 400° C. to about 350° C., the cloudiness of the melt increases, thus indicating further precipitation of the salt from solution. When the malt is cooled to about 275°, it becomes thick and grainy, indicating heavy salt precipitation. This indicates the desirability of cooling the melt containing the reaction product salt, in order to facilitate its precipitation. For this reason it is preferred to run the destruction reaction at about 400° C., then to cool the melt containing the salt to assist in salt precipitation.

F. If a salt crystal growth promoting agent such as manganese dichloride, $MnCl_2$, is added to the melt, viscosity is reduced, salt crystals grow and settle out still more readily. It is known that manganese salts such as the dichloride, as well as lead and cadmium salts, will assist in the precipitation of salt from water (see *Kirk*

*Othmer,* 2d ed, Vol 18, p.480), but so far as is known such agents have not heretofore been used to assist in the precipitation of salt from molten solutions.

The method of this invention is further described by the following Examples which are illustrative only and not intended to be restrictive. Unless otherwise indicated, all parts are by weight.

EXAMPLE 1

A mixture of 33.5 parts by weight (0.84 mol) of sodium hydroxide and 343 parts (4.0 mol) of sodium nitrate (corresponding to a $NaNO_3/NaOH$ mol ratio of about 4.8) were introduced into a closed steel reaction vessel equipped with a dip tube and a condenser. After the hydroxide-nitrate mixture has been converted to a molten bath by application of heat, 50 parts of polychlorinated biphenyl were introduced. This corresponds to a NaOH/PCB mol ratio of 1.1 and a $NaNO_3$/PCB mol ratio of 1.1. The PCB was fed beneath the surface of the molten bath by allowing it to drip slowly into a stream of nitrogen passing through the dip tube. The quantities of NaOH and $NaNO_3$ were in approximately 10% excess of that needed stoichiometrically to convert all the PCB to NaCl, $CO_2$ and water, however the nitrate was not regenerated by addition of external air during the reaction. PCB injection into the molten bath was continued over a period of about 30 minutes during which period the temperature of the bath was maintained at a temperature of 338° C.–340° C. Following completion of injection of the PCB, the temperature of the molten bath was raised to 345° C. and maintained at that temperature for one additional hour. The reaction vessel was then opened and the molten bath removed and allowed to solidify by cooling. 0.04 part of a brown, waxy material was removed from the resultant cake by washing with toluene. On analysis by gas chromatography, the waxy material was shown to contain 1000 ppm of PCB. This indicated a 99.99+% destruction of the PCB injected into the reaction vessel. The amount of NaCl formed in this reaction was inefficient to judge its solubility in the melt, but some grainieness was evident, indicating incipient precipitation.

EXAMPLE 2

The procedure of Example 1 was repeated. 50 parts of an askarel comprised of 70% Monsanto Chemical Company AROCLOR 1254 brand of PCB and 30% of trichlorobenzene, was injected into the molten bath over a two hour period, using air instead of nitrogen as the carrier and purge gas in the dip tube. The air flow rate was 1 L./min., which was sufficient to reoxidize the nitrite formed. The average melt temperature was about 345° C. A temperature of 340° C. was maintained for an additional one hour after addition of PCB had stopped, after which the reaction vessel was opened and the molten bath removed and permitted to solidify. 0.155 part of a waxy substance was extracted by toluene washing from the resultant cake and was found, on analysis, to contain 9750 parts of PCB. This represented a 99.5% destruction of the PCB injected into the reaction vessel. The air stream helped to regenerate and maintain the proportion of nitrate.

EXAMPLE 3

The procedure of Example 1 was repeated except that 68.6 parts (0.81 mol) of sodium nitrate were used in the hydroxide-nitrate mix. This represented an approximate 1:1 nitrate to hydroxide ratio. 50 parts of the PCB-containing askarel were injected into the melt by means of an air stream over a period of one hour at a temperature of 270° C. The amount of $NaNO_3$ was less than that required stoichiometrically to convert the dehalogenated biphenyl secondary reaction product to $CO_2$. The hydroxide-nitrate molten bath temperature was maintained at 270° C. for an additional hour while the injection of air into the bath was continued. On separation of the molten bath and solidification, 2.55 parts of a light tan waxy substance were recovered which, on analysis, was found to contain 4.2% PCB. This represented a 99.78% destruction of the PCB injected into the reaction vessel. This example illustrates that less complete destruction is attained as temperature is decreased.

EXAMPLE 4

The procedure of Example 1 was repeated using 114.4 parts (1.35 mol) of sodium nitrate in the hydroxide-nitrate mix together with 0.18 parts of ammonium molybdate as a catalyst. The $NO_3/OH$ ratio was about 1.6. 50 parts of the askarel were injected into the hydroxide-nitrate molten bath by means of an air stream. Injection time and subsequent reaction time totalled 6.5 hours at a temperature of 410° C. The salt did not precipitate, as its solubility limit was not exceeded. The solidified molten bath was white in color, exhibited no exudation, and no PCB could be washed from it. 5.75 parts of condensate collected from the condenser were found to contain 22 ppm of PCB on analysis. This represented a 99.995% destruction of the PCB injected into the furnace, but the $NaNO_3$ proportions used were too low for salt removal.

To show the criticality of using the hydroxide and nitrate together in the method of this invention, the following Examples 5 and 6 were conducted in which the nitrate and hydroxide components of the mix were used, in the absence of each other.

EXAMPLE 5

The procedure of Example 1 was repeated except that the molten bath consisted of 67 parts of sodium hydroxide together with 0.35 part of ammonium molybdate as a catalyst. The molten bath contained no alkali metal nitrate. Addition of 100 parts of PCB-containing askarel into the molten bath by means of an air stream was made over a period of 70 minutes while maintaining a temperature of 340° C. The injection of air was continued for an additional hour while continuing to maintain a 340° C. temperature. On opening the reaction vessel, it was found that the bath was substantially solid rather than liquid. Salt remained suspended in the melt. Grainy deposits of an orange-red color were found in the upper reaches of the reaction vessel. Deposits also partially blocked the condenser. 15 parts of condensate were collected from the condenser which, when analyzed, showed a PCB content of 29.6%. This represented a 91.1% destruction of the PCB injected into the reaction vessel, a level low as not to be useful in a practical sense.

EXAMPLE 6

The procedure of Example 1 was repeated except that the molten bath consisted of 312 parts of sodium nitrate together with 0.18 part of ammonium molybdate as a catalyst. The molten bath contained no alkali metal hydroxide. Addition of 50 parts of PCB-containing askarel into the molten bath by an air stream was made over a period of 1.75 hours while maintaining a temperature of 400° C. The injection of air was continued for an additional hour while maintaining a 350° C. temperature. On opening of the reaction vessel, the bath was found to be black with a carbonaceous substance. On solidification of the molten bath, a gummy exudate formed on the surface. On extraction with solvent, this exudate was found to contain substantial particulate carbon. The level of destruction of the PCBs was much lower than in Examples 1–5.

EXAMPLE 7

The procedure of Example 1 is repeated except that the hydroxide-nitrate mix comprises 33.5 parts of potassium hydroxide and 343 parts of potassium nitrate. All other conditions of Example 1 remain the same. Percentage of destruction of PCBs is essentially the same as that obtained in Example 1. This demonstrates that other alkali metals can be used instead of sodium.

The description of the method of this invention has thus far been directed principally to the destruction of polyhalogenated polyphenyls, and particularly to polychlorinated biphenyls with respect to which it has been found to be especially effective. The method of this invention is, however, equally applicable to the destruction of other toxic halogen containing products, as well as to the destruction of sulfur and phosphorus containing toxic products. Representative of these types of products are, dichlorodiphenyltrichloroethane (DDT); gamma hexachlorocyclohexane (LINDANE); ortho-4-bromo-2,5-dichlorophenyl-omethylphenyl phosphorothionate (LEPTOPHOS); hexachlorobenzene; 2,4-dichlorophenoxyacetic acid (2,4 D); 2,4,5-trichlorophenoxyacetic acid (2,4,5 T); 2,3,7,8tetrachlorodibenzop-dioxin (AGENT ORANGE); 2,2-dichloroethenyl dimethyl phosphate (DICHLOROPHOS); 0,0-dimethyl dithiophosphate of diethyl mercaptosuccinate (MALATHION); ethylene dibromide and other halogencontaining toxic organic products. The destruction of a phosphorous and sulfurcontaining toxic organic chemical compound is shown in the following example.

Example 8

The reaction vessel described in Example 1 was charged with 65 parts NaOH, 130 parts of $NaNO_3$, and 0.25 parts of ammonium molybdate. The mixture was melted and heated to 440° C. After temperature equilibration, 50 parts of Ortho Malathion 50 Insect Spray, 50% solution (Chevron Chemical Company) were added over a one-hour period. The reactor was opened and was found to contain partly solidified salts. Analysis of the salts showed a phosphate content of 2.98% (as $P_2O_5$) and a sulfate content of 11.8%. The S/P ratio of the salts was approximately the same as that of the Malathion, which indicated complete destruction.

It should be noted that a further advantage of the invention is that the reaction mixture is non-corrosive to steel, in contrast to a reaction mass which contains hydroxide but not nitrate. Inspection of the reaction vessel after use shows a shiny hard black oxide coating, without rusting or corrosion. This greatly reduces the cost of the reactor that would otherwise be required.

Having described the invention, what is claimed is:

1. In a method for destroying a toxic organic chemical product wherein said toxic product is contacted with a molten mixture of an alkali metal hydroxide and an alkali metal nitrate to form an alkali metal salt as a product of reaction with said hydroxide, an organic intermediate reaction product also being produced, the improvement which comprises, maintaining a mol ratio of said nitrate to said hydroxide in said molten mixture of at least 2:1, the proportion of said nitrate in said mixture further being sufficiently high to provide a low viscosity of said mixture so that a large portion of said alkali metal salt settles as solid salt particles to the bottom of said molten mixture, reacting said organic intermediate rection product with said nitrate to form CO, $CO_2$, or a mixture thereof, and water, and removing said solid salt particles from said molten mixture at the bottom thereof.

2. The method of claim 1 wherein the mol ratio of nitrate to said hydroxide is in the range of 2:1 to 5:1.

3. The method of claim 1 wherein the mol ratio of nitrate to said hydroxide to said toxic product is in the range of about 2:1:1 to about 5:1:1.

4. The method of claim 3 wherein said toxic organic chemical product is a polyhalogenated polyphenyl product.

5. The method according to claim 4 in which the polyhalognenated polyphenyl product is contacted in gaseous form with said molten mixture.

6. The method of claim 1 further wherein a portion of said nitrate is removed from the bottom of said molten mixture along with said solid salt particles, and additional mitrate is added to maintain the proportion of said nitrate in said mixture sufficiently high that said solid salt particles continue to settle to the bottom of said molten mixture.

7. The method of claim 1 wherein said mixture is initially melted by heat from an external source, and wherein said mixture is thereafter maintained in molten condition by heat of reaction.

8. The method of claim 1 including the further step of removing heat of reaction from said molten mixture, as said destruction proceeds, to maintain a substantially constant temperature.

9. The method according to claim 1 in which the toxic organic chemical product has a substituent any of halogen, sulfur o phosphorous atoms.

10. The method according to claim 1 in which said molten mixture is at a temperature which is above the boiling point of said toxic product.

11. The method according to claim 1 in which said nitrate is reduced to the corresponding nitrite by reaction with said intermediate reaction product, and at least a portion of said molten mixture is contacted with a stream of oxygen-containing gas, to oxidize the nitrite back to the nitrate.

12. The method according to claim 1 in which additional alkali metal hydroxide and nitrate are added to the mixture to at least partially replace that which reacted in the destruction of said product.

13. The method according to claim 1 in which the mixture is cooled after said salt has formed therein, thereby further decreasing the solubility of said salt in the mixture and increasing its precipitation from said mixture.

14. The method according to claim 1 further wherein a salt crystal growth promoting agent is also present in said mixture, to promote growth of salt crystals in the molten mixture.

15. The method of claim 14 wherein said salt crystal growth promoting agent is manganese chloride.

* * * * *